United States Patent [19]

Rhodes

[11] Patent Number: 5,538,126
[45] Date of Patent: Jul. 23, 1996

[54] CONVEYOR SYSTEM WITH MEANS TO ROTATE A WORKPIECE DURING CONVEYING

[76] Inventor: Arthur B. Rhodes, 3347 Campground Rd., Louisville, Ky. 40211

[21] Appl. No.: 283,045

[22] Filed: Jul. 29, 1994

[51] Int. Cl.$^6$ ................................................ B65G 47/24
[52] U.S. Cl. ........................ 198/375; 198/465.1; 118/232; 118/500
[58] Field of Search .......................... 198/465.1, 803.01, 198/474.1, 680, 339.1, 345.1, 375; 118/56, 218, 232, 239, 230, 500

[56] References Cited

U.S. PATENT DOCUMENTS

| | | | |
|---|---|---|---|
| 289,460 | 7/1959 | Klamp | 104/88 |
| 2,965,043 | 12/1960 | Klamp et al. | 104/88 |
| 3,174,439 | 3/1965 | Edgar et al. | 104/88 |
| 3,407,751 | 10/1968 | Orwin | 104/172 |
| 4,108,107 | 8/1978 | Scheuermann | 118/500 X |
| 4,180,152 | 12/1979 | Sefcik | 198/680 X |
| 4,438,702 | 3/1984 | Rhodes | 104/172 |
| 4,513,682 | 4/1985 | Otocki | 198/680 X |
| 4,638,740 | 1/1987 | Rhodes | 104/172.2 |
| 4,644,869 | 2/1987 | Rhodes | 104/172.2 |
| 4,770,285 | 9/1988 | Rhodes | 198/378 |
| 5,065,678 | 11/1991 | Rhodes | 104/88 |
| 5,078,083 | 1/1992 | DiMaio et al. | 118/500 X |

*Primary Examiner*—D. Glenn Dayoan
*Attorney, Agent, or Firm*—Middleton & Reutlinger; Charles G. Lamb

[57] ABSTRACT

A conveyor system of the present invention includes a conveyor track defining a conveyor path with at least one load carrying unit movable along the conveyor track. The load carrying unit includes a movable pin for engagement with a movable endless conveyor chain of the conveyor track for engaging or disengaging the load carrying unit to or from the conveyor track. A pair of spaced rear wheels are mounted onto an elongated transversely extending shaft or rod at a rear end of the load carrying unit wherein the elongated shaft or rod extends outwardly from the load carrying unit and includes a workpiece mounting assembly on the end thereof. The elongated shaft is rotatable with the movement of the rear wheels and therefore rotates a workpiece which is mounted to the shaft during movement along the conveying path.

14 Claims, 3 Drawing Sheets

CONVEYOR SYSTEM WITH MEANS TO ROTATE A WORKPIECE DURING CONVEYING

BACKGROUND OF THE INVENTION

The present invention relates to conveyor systems, and more particularly, a conveyor system having means for rotating objects or workpieces during conveying along a conveying path.

Conveying systems are typically used in manufacturing facilities to move workpieces through work stations located along a conveying path. Generally, in the conveying of workpieces along a conveying path, the workpieces are placed upon a load carrying unit and are stationary thereon as they go from work station to work station. There are a number of conveying systems known to me for moving workpieces from work station to work station wherein the workpieces are stationarily mounted on load carrying units being moved along the conveying path. Examples of patents directed to such conveying systems include U.S. Pat. No. 4,438,702; U.S. Pat. No. 4,644,869; U.S. Pat. No. 4,638,740; U.S. Pat. No. 4,770,285; and U.S. Pat. No. 5,065,678.

Moreover, in the spraying of coatings onto workpieces, such as furniture, generally the load carrying units are stopped, the workpieces to be spray coated are then manually sprayed wherein the workpieces are moved about manually as the operator adjusts the spray mechanism to spray all of the parts of the workpiece. Upon the completion of the spraying operation the piece is then re-placed on the load carrying unit for further transferring to a drying or curing operation.

SUMMARY OF THE INVENTION

The present invention recognizes the problem in conveying of workpieces, such as furniture, and the like to spray booths wherein the furniture or other workpiece is removed and sprayed with a particular coating and then placed back upon the load carrying unit for transfer to another operation, such as a drying oven.

It is an object of the present invention to provide a conveying system wherein workpieces are rotated continually along a conveying path, and particularly at a workpiece processing station.

It is another object of the present invention to provide a means for automatically rotating workpieces on a conveying path during a spray coating operation.

It is still a further object to provide a conveying system wherein a workpiece is rotated continually along a conveying path and the conveying system includes means to simultaneously move the workpiece vertically or angularly.

It is even a further object of the present invention to provide a conveying system which will rotate workpieces to be processed at variable rotatable speeds during a conveying operation.

An even further object of the present invention is to provide a conveyor system that allows for an uneven coating of a workpiece using high coating transfer means, such as dipping, flow coating, and the like, whereby the resulting coated workpiece will have an even uniform coating, said conveyor system including means to oscillate and rotate said workpiece immediately after a coating operation thereby allowing the coating to continually flow over the part until dry, eliminating unwanted runs and drips.

More particularly, the present invention provides a conveyor system comprising:

a conveyor track defining a conveyor path;

at least one load carrying unit movable along said conveyor track;

conveyor track engaging and disengaging means associated with said at least one load carrying unit for movement between a conveyor track engaging position engaging the load carrying unit to said conveyor track and a conveyor track disengaged position disengaging the load carrying unit from said conveyor track; and, means to rotate a workpiece on said load carrying unit as said load carrying unit moves along said conveying path.

BRIEF DESCRIPTION OF THE DRAWINGS

A better understanding of the invention will be had upon reference to the following description in conjunction with the accompanying drawings, wherein like numerals refer to like parts throughout the several views wherein.

DETAILED DESCRIPTION OF THE PREFERRED EMBODIMENTS

Figure 1:
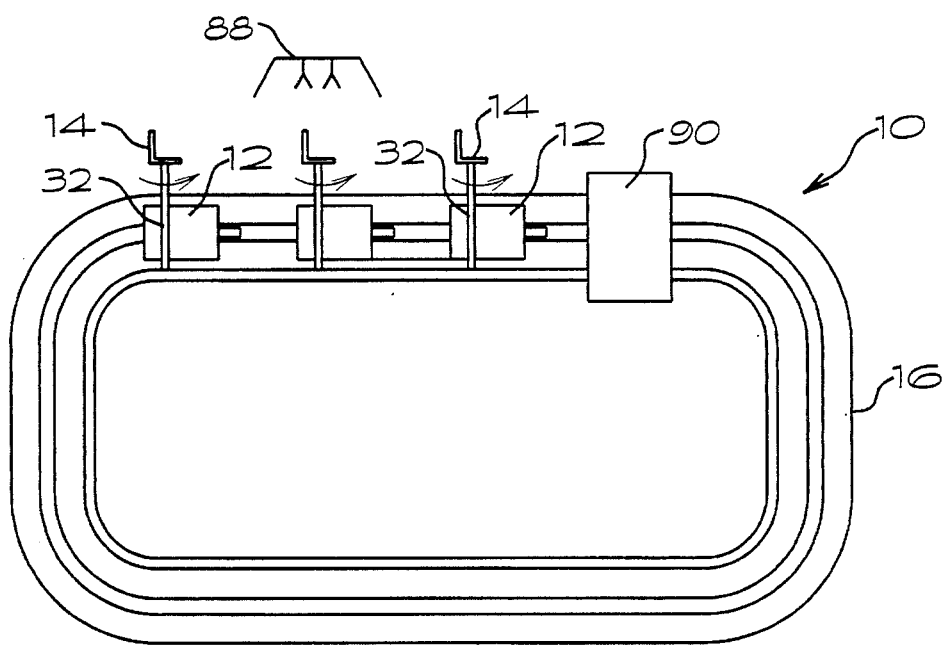
FIG. 1 is a plan view of a conveyor system of the present invention.

FIG. 1 schematically shows a conveyor system, generally denoted as the numeral 10, incorporating features of the present invention. The conveyor system 10 is shown as including a closed loop conveyor track 16 with an endless chain 34 having interlocking chainlinks.

Load carrying units 12 are coupled or engaged to the endless chain 34 of track 16 for movement therewith. The endless chain conveyor 34 is generally driven by an appropriate electric motor (not shown).

Figure 2:
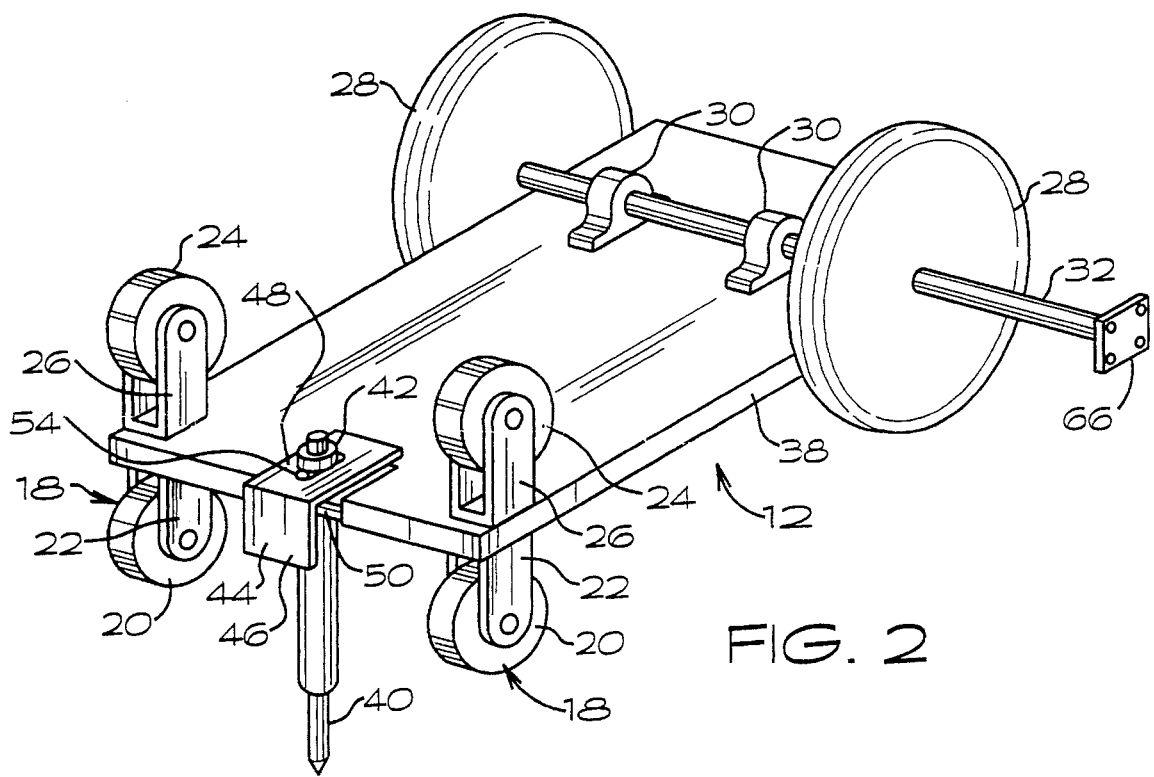
FIG. 2 is a perspective view, as seen from the front, of a load carrying unit of the present invention movable with the conveyor system of FIG. 1.

Now with reference to FIG. 2, there is shown a perspective view of one example of a load carrying unit 12 which can be used with the conveyor system 10. As shown, the load carrying unit 12 includes frame structure 38, front wheel assemblies 18 at the front end of the load carrying unit 12 and rear wheels 28 on the rear which are rotatably attached to the frame structure 38 through bearing assemblies 30. The frame structure 38 can be of virtually any construction and configuration to support a load or workpiece, such as chair 14, in a cantilevered position as shown in FIG. 1. With continued reference to FIG. 2 and additional reference to FIG. 3, the load carrying unit 12 further includes a conveyor chain engaging, disengaging pin 40 attached to the frame 38 near the front end of the unit 12. The chain engagement pin 40 is movable between a lowered, conveyor chain engaged position as shown in FIG. 4 and a disengaged position. In the lowered, conveyor chain engaging position, the depending end of the pin 40 is received in an opening of one of the horizontal links of the conveyor track chain 34 and in the raised conveyor chain disengaged position the depending end of the pin 40 is spaced a distance above and out of contact with the conveyor track chain 34 so that the conveyor track chain 34 moves beneath the depending end of the pin 40.

Various constructions can be used to movably attach the movable pin 40 to the frame structure 38. One such means is shown and described in my U.S. Pat. No. 5,065,678. As shown in FIG. 2, a movable pivotal right angled plate 44 for vertical movement of pin 40 is located at the front of the load carrying unit 12. The angled plate 44 includes a first arm 46 and a second arm 48 at a right angle to the first arm 46. A pivot axle 50 is located across the plate 44 at the junction of the first arm 46 and the second arm 48 and is affixed thereto so that the plate 46 will move with the axle 50 as it rotates. The opposite ends of the axle 50 extend beyond the opposite lateral sides of the plate 44 and are received in appropriate holes (not shown) in the frame 38 for rotational movement therein. The first arm 46 depends from the axle 50 at the front of the load carrying unit 12 and the second arm 48 extends back from the axle 50 to the location of the movable pin 50. The second arm 48 is formed with elongated opening 54 therein. The upward extending portion of the pin 40 is received in the elongated opening 54 with the keeper 42 located above the second arm 48 so it is in abutment with the top side of the second arm 48. The conveyor engagement pin 40 is biased to the lowered conveyor chain engagement position by the force of gravity. Pressure against first arm 46 in a direction inwardly of the load carrying unit 12 pivots second arm 48 so that pin 40 moves upward, disengaging from chain 34.

Figure 5:
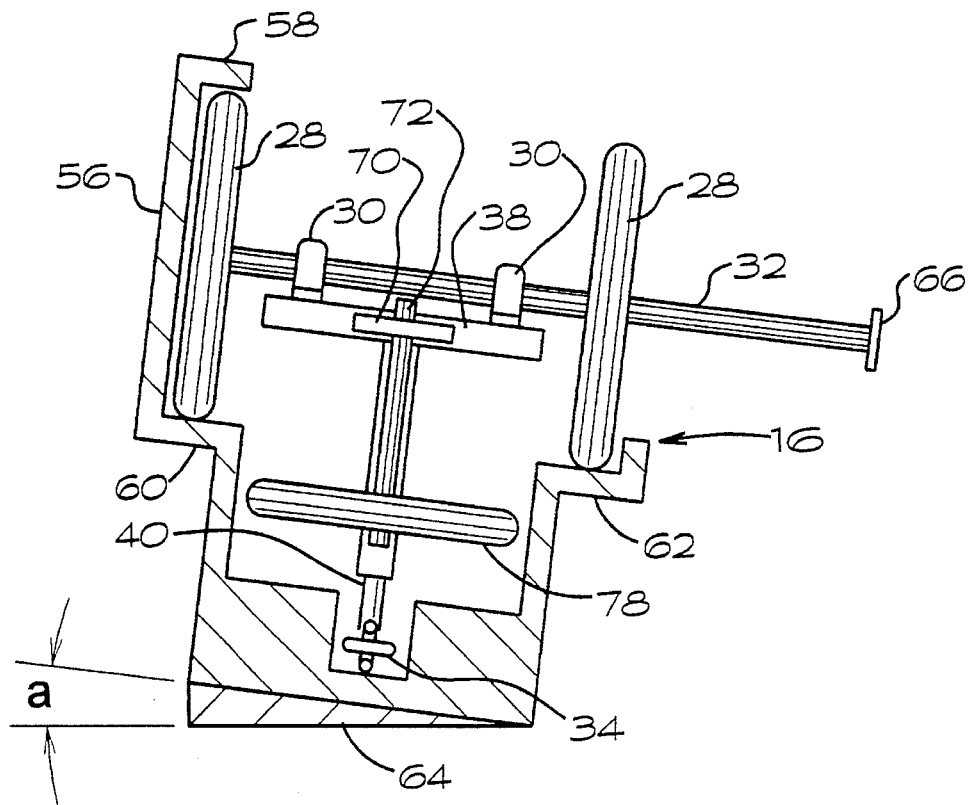
FIG. 5 is a front view of the load carrying unit and conveyor track shown in FIG. 4; and, FIG. 6 is a side view of a conveyor track of the present invention showing an additional element of the present invention for rotating workpieces on the load carrying unit at different or varying rotatable speeds.

With continued reference to FIG. 2, the load carrying 12 of the present invention is provided with front wheel track engaging assemblies 18 at the front end for movable engagement with the conveyor track 16. The front wheel track engaging assemblies 18 include a lower wheel 20 and a pivot assembly or castor 22 which is pivotally attached to the frame structure 38 and an upper front track engaging wheel 24 which is pivotally attached to the upper portion of the frame 38 with pivot assembly or castor 26. The front wheels 20 and 24 on one side of the load carrying unit 12 are engaged within the C-shaped track portion 56 (FIG. 5) which includes an upper inwardly extending arm 58 which is in contact with a front wheel 24 and a lower inwardly extending arm 60 upon which a front wheel 20 is in contact or engagement therewith. As further shown in FIG. 5, the opposite side of the conveyor track 16 from C-shaped portion 56 includes a horizontal track portion 62 which is aligned with and in the same plane as the lower inwardly extending arm 60 and upon which an opposite lower front wheel 20 of load carrying unit 12 is engaged for movement therealong. The pivotally attached pivot assemblies or castors 22 and 26 provide the means for the turning or steering of load carrying units 12 as the units make turns in the conveyor track 16. Moreover, as discussed more fully hereinafter, by providing C-shaped track portions 56 in the conveyor track 16, the track 16 may be positioned at different levels to horizontal, in turn varying the vertical position of the workpiece 14. As shown in FIG. 5, a wedge segment 64 is provided to position the conveyor track 16 at an angled position, identified by the letter "a" to the floor of a manufacturing facility. When a wedge segment 64 is utilized, the upper, inwardly extending arm 58 in contact with wheel 24 and rear wheel 28, to be discussed hereinafter, maintains the load carrying unit 12 at a stable position as the load carrying unit 12 moves at an angled position as it travels along the conveyor track 16. Selectively positioning a number of wedge segments 64 at varying angles "a" enables a workpiece 14 to move up and down as well as rotate as it moves along the track 16.

Figure 3:
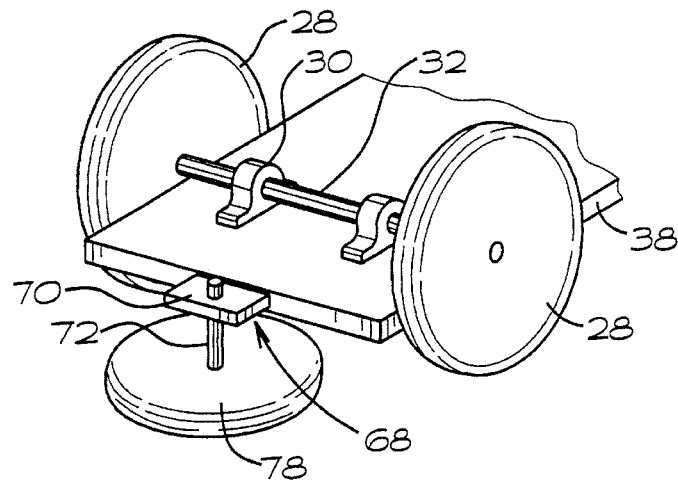
FIG. 3 is a partial perspective view of a load carrying unit of FIG. 2 as seen from the rear of the load carrying unit.
Figure 4:
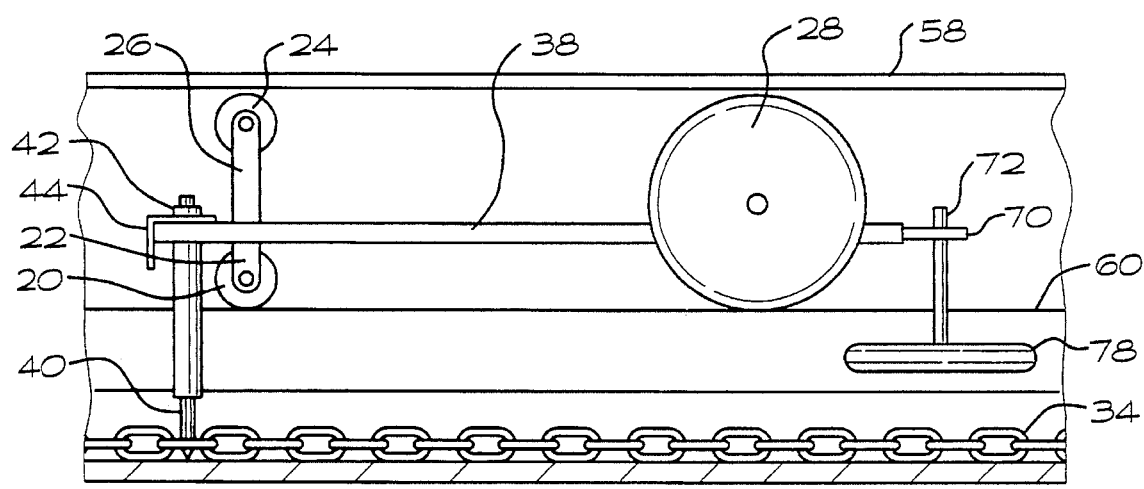
FIG. 4 is a side view of the load carrying unit of FIG. 2 as shown engaged in a conveyor track of the present invention.

As further shown in FIG. 2 and FIG. 3, rear wheels 28 are mounted onto an elongated rotatable workpiece mounting rod 32 which extends transverse of the load carrying unit 12. Bearing assemblies 30 are utilized to rotatably mount rod 32 to the frame structure 38. One end of the workpiece mounting rod or shaft 32 receives a rear wheel 28 thereon, and as shown in FIG. 5, one rear wheel 28 is received within the C-shaped track portion 56 and the opposite end of the workpiece mounting rod 32 extends beyond the load carrying unit 12 and its outer extremity includes a mounting plate 66 upon which a workpiece, exemplified as chair 14 (FIG. 1), is mounted.

As best shown in FIG. 4, the distance between the inner surface of arms 58 and 60 is substantially equal to the diameter of a rear wheel 28. Moreover, the size and location of front wheels 20 and 24 on one side of the front end of the load carrying unit 12, are such that the distance from the outer arcuate surface of wheel 24 to the outer arcuate surface of wheel 20 is substantially equal to the diameter of a rear wheel 28.

As shown in FIGS. 3, 4 and 5, a load carrying 12 guide assembly 68 is provided at the rear of the load carrying unit 12. The guide assembly 68 includes a horizontally extending flat plate member 70 which is affixed by welding or the like to the frame 38 of the load carrying unit 12. Extending through the plate member 70 is an elongated pin 72 which is rotatable therein and extends downwardly from the plate member 70. The downward extremity of pin 72 is attached to horizontally positioned, rotatable guide wheel 78. Guide wheel 78, as best shown in FIG. 5, is disposed within the conveyor track 16. The guide wheel 78 follows the contour of the track 16 and as the conveyor track 16 turns and curves, the guide wheel 78 follows the contour thereof, in turn maintaining load carrying unit 12 in alignment with track 16.

Figure 6:
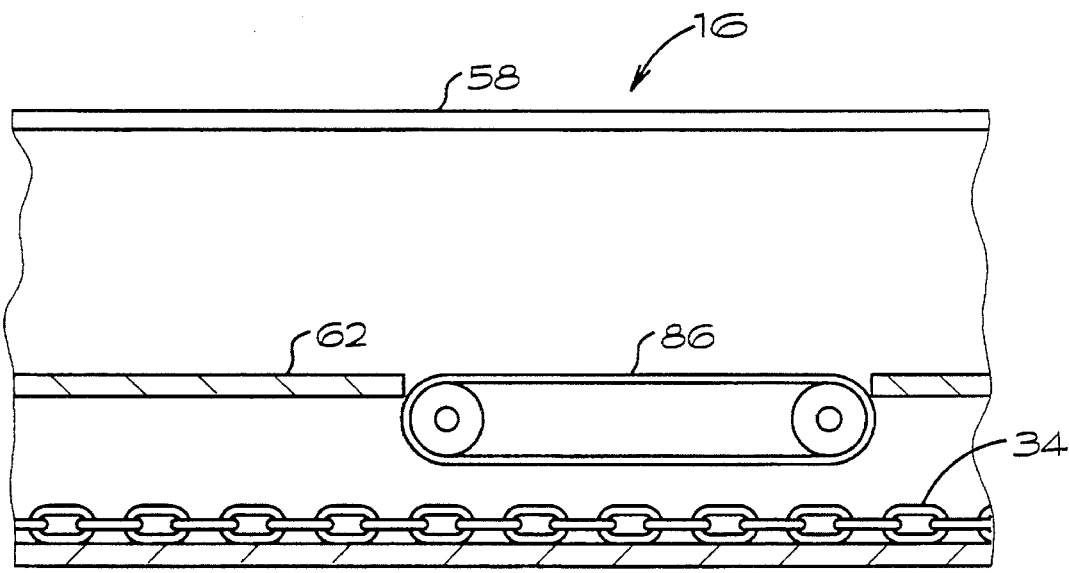

As shown in FIG. 6, the conveyor system 10 of the present invention may also include movable belt conveyors 86 at preselected positions along the conveyor track 16. The movable belt conveyors 86, which are generally speed adjustable, are used in spaced parallel pairs. One of the conveyors 86 is generally part of the lower inwardly extending arm 60 and the second conveyor 86 of the pair is part of the horizontal track 62. Thus, when the opposed rear wheels 28 contact a pair of spaced belt conveyors 86, the adjustable speed movable belt conveyor 86 increase or decrease the rotational speed of the rear wheels 28 thereby enabling a control of the rotational movement of the workpiece 14 which is mounted to the shaft 32. The workpiece 14 rotates at the same rotational speed as the rotational speed of the rear wheels 28. Moreover, it is realized that in operation, the size of the rear wheels 28 is also directly related to the rotational speed of the workpiece. Smaller rear wheels 28 will rotate workpieces 14 at a faster rate than larger rear wheels 28. And, such selection of size of rear wheels 28 are of consequence in determining the rotational speed of the workpiece 14 as it moves along the conveying track 1.6.

In operation, a workpiece, such as a chair 14, is mounted to a mounting plate 66 which is at one end of a workpiece mounting rod 32. The chain engaging pin 40 which is being held in a raised position by the pivotal right angle plate 44, is then released to fall into one of the lengths of the endless chain 34. As the endless chain 34 moves the load carrying 12 along a conveying track 16, the workpiece or chair 14 is rotated as the wheels 28 turn. At selected work stations, such as spray coating station 88 and drying oven 90 (FIG. 1,) along the conveying system 10, the workpiece 14 is subjected to these processing or treating operations. Particularly, in the furniture industry, as a workpiece, such as a chair 14, passes through a spray coating station 88, the chair 14 rotates as it passes through. After the coating has been applied to the chair, the wheels 28 may contact or engage adjustable speed movable belt conveyors 86 so that a recently coated chair 14 can then be rotated at a preselected speed which is generally greater than the speed of the movement of the conveyor chain 34 through the coating station 88 thereby enabling quick and uniform removal of excess coating. Moreover, by the use of wedge segments 64 at selected positions along the conveying system, the chair 14 may be moved in a vertical (oscillating) direction as well as a rotating direction. Even further, wedge segments 64 may be of rectangular cross-section and used to raise the entire track 16 when the workpiece 14 is subjected to, for example, a drying oven 90. Thus, a raised track 16 forming a loop or serpentine-type configuration is possible thereby conserving floor space area and improving drying efficiency.

The foregoing description is given primarily for clearness of understanding and no unnecessary limitations are to be understood therefrom for modifications will become obvious to those skilled in the art upon reading this disclosure and may be made without departing from the spirit of the invention or scope of the appended claims.

What is claimed is:

1. The conveyor system comprising:

a conveyor track comprising a conveyor path;

at least one load carrying unit movable along said conveyor track;

conveyor track engaging and disengaging means associated with said at least one load carrying unit for movement between a conveyor track engaging position engaging the load carrying unit to said conveyor track and a conveyor track disengaged position disengaging the load carrying unit from said conveyor track; and, means for rotating a workpiece on said load carrying unit as said load carrying unit moves along said conveying path.

2. The conveyor system of claim 1 wherein said at least one load carrying unit includes a pair of rear wheels spaced on opposite sides of said load carrying unit and said means to rotate a workpiece includes an elongated transversely extending rod with one end attached to one rear wheel and said opposite end of said rod extending transversely from said load carrying unit and having means thereon to mount a workpiece thereto.

3. The conveyor system of claim 2 wherein said rear wheels are mounted onto said elongated transversely extending rod.

4. The conveyor system of claim 3 wherein said load carrying unit includes at least one bearing assembly mounted on a top side of said load carrying unit, said bearing assembly receiving said elongated transversely extending rod therethrough.

5. The conveyor system of claim 1 wherein said at least one load carrying unit includes wheel assemblies spaced on opposite sides of a front end of said load carrying unit, said front wheel assemblies including a lower wheel pivotally attached to an underside of said load carrying unit and an upper wheel pivotally attached to an upper side of said load carrying unit.

6. The conveyor system of claim 5 including a pair of real wheels spaced on opposite sides of said load carrying unit at a rear of said unit, said diameter of said rear wheels being equal to the distance from an outer arcuate surface of a lower wheel to an opposed arcuate surface on an upper wheel of one of said front wheel assemblies.

7. The conveyor system of claim 6, said conveyor track including a C-shaped section for receiving one rear wheel and one front wheel assembly, the internal distance between an upper horizontal arm of said C-shaped section and a lower horizontal arm of said C-shaped section being substantially equal to the diameter of said rear wheel.

8. The conveyor system of claim 1 including guiding means mounted to the rear portion of said load carrying unit, said guiding means being mounted to follow the contour of said conveying path.

9. The conveyor system of claim 8 wherein said guiding means is a guide wheel rotatably attached to said load carrying unit.

10. The conveyor system of claim 9 wherein said conveyor track receives said guide wheel therein.

11. The conveyor system of claim 1 including means to change the speed of rotation of said means to rotate a workpiece.

12. The conveyor system of claim 11 wherein said means to change the speed of rotation of said workpiece includes an adjustable speed movable belt conveyor spaced at a preselected location along said conveyor track, said movable belt conveyor being in engagement with at least one rear wheel of said load carrying unit.

13. The conveyor system of claim 1 including means to change the angle of said conveying path relative to horizontal.

14. The conveyor system of claim 13 wherein said load carrying unit includes a rear wheel and said conveyor track includes a C-shaped section for receiving said rear wheel, said C-shaped section having a pair of spaced outwardly extending horizontal arms with the distance between said horizontally extending arms being equal to a diameter of said wheel, said means to change an angle of said conveying path including a wedge member at a preselected angle inserted between said C-shaped section and a floor upon which said conveying track is placed.

\* \* \* \* \*